Oct. 17, 1961    T. A. BUCHHOLD    3,005,117
ELECTRO-MECHANICAL DEVICE
Filed March 20, 1959    10 Sheets-Sheet 1

Inventor:
Theodor A. Buchhold
by Alfred B. Levine
His Attorney.

Inventor:
Theodor A. Buchhold
by Alfred B. Levine
His Attorney.

Oct. 17, 1961  T. A. BUCHHOLD  3,005,117
ELECTRO-MECHANICAL DEVICE
Filed March 20, 1959  10 Sheets-Sheet 4

Inventor:
Theodor A. Buchhold,
by Alfred B. Levine
His Attorney.

Inventor:
Theodor A. Buchhold,
by Alfred B. Levine
His Attorney.

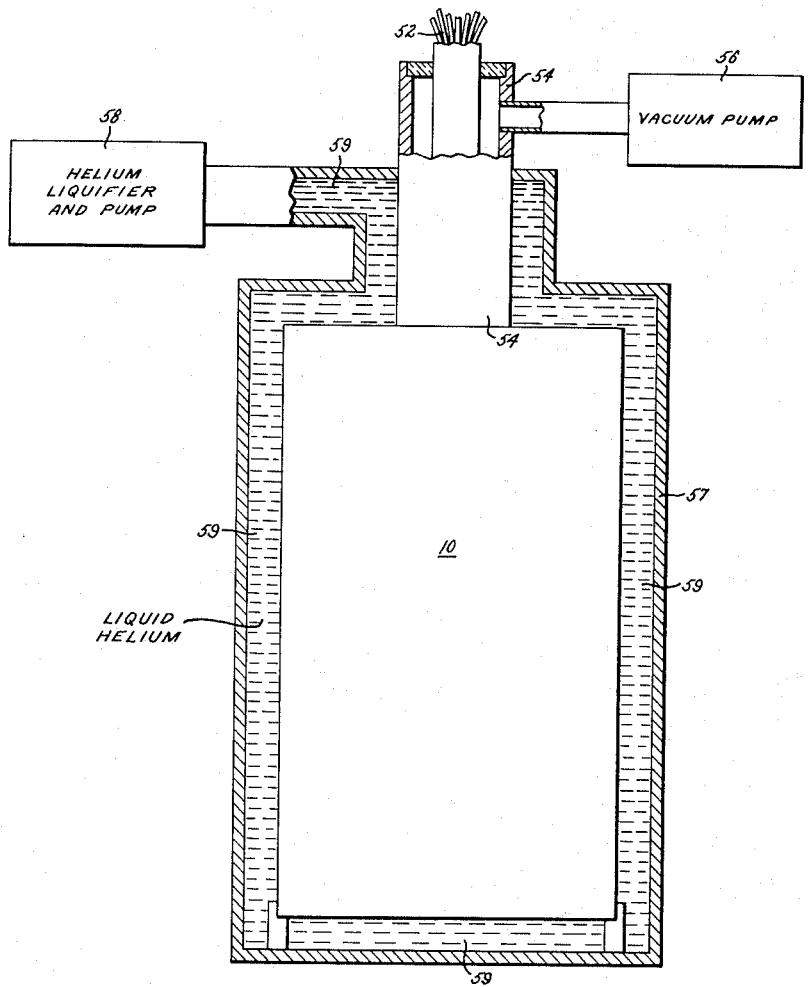

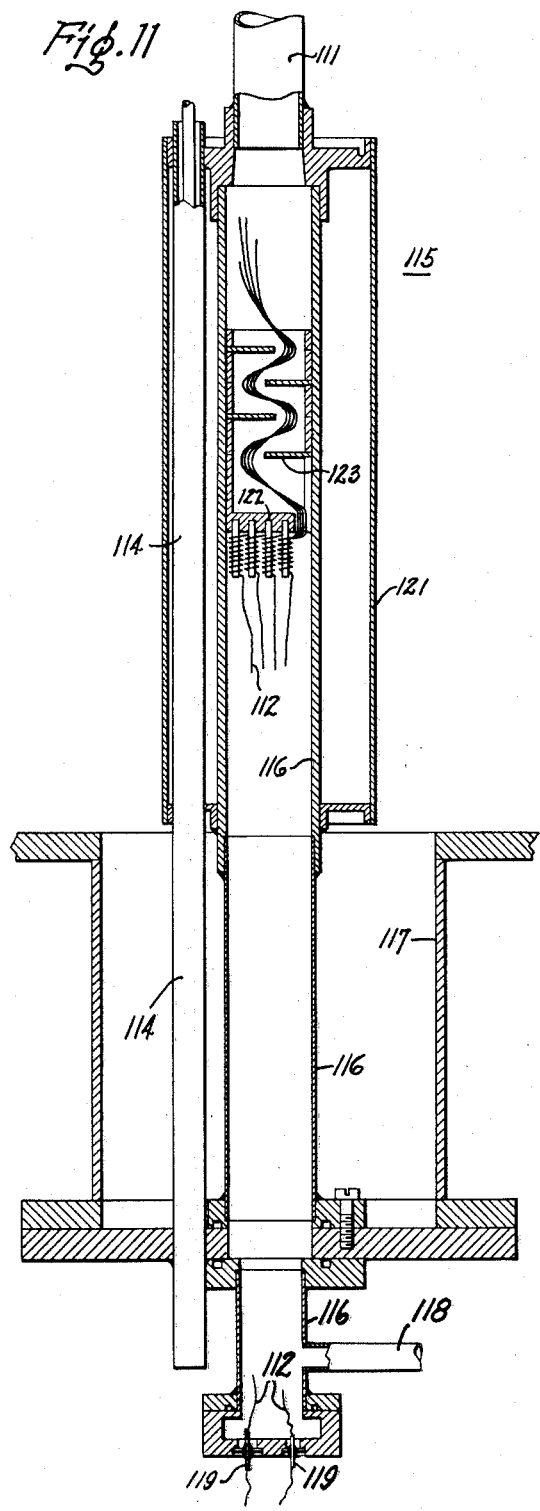
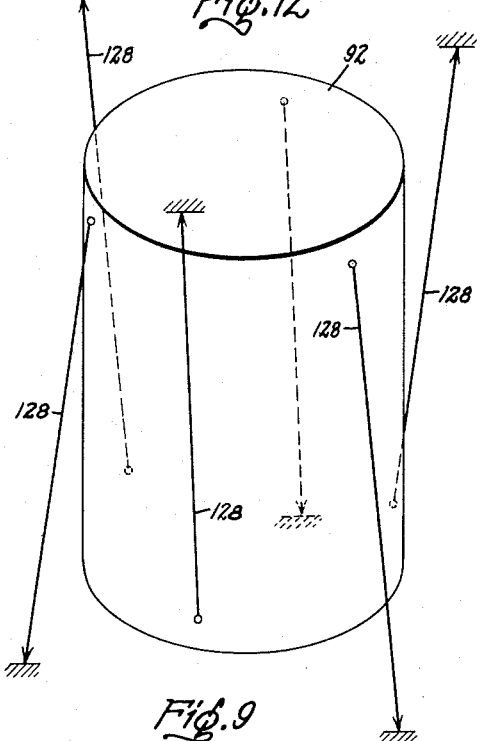
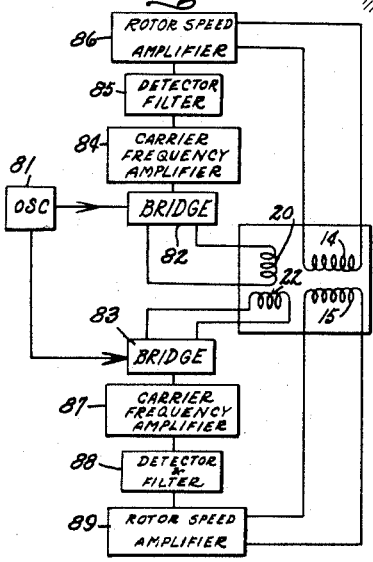

Oct. 17, 1961   T. A. BUCHHOLD   3,005,117
ELECTRO-MECHANICAL DEVICE
Filed March 20, 1959   10 Sheets-Sheet 8
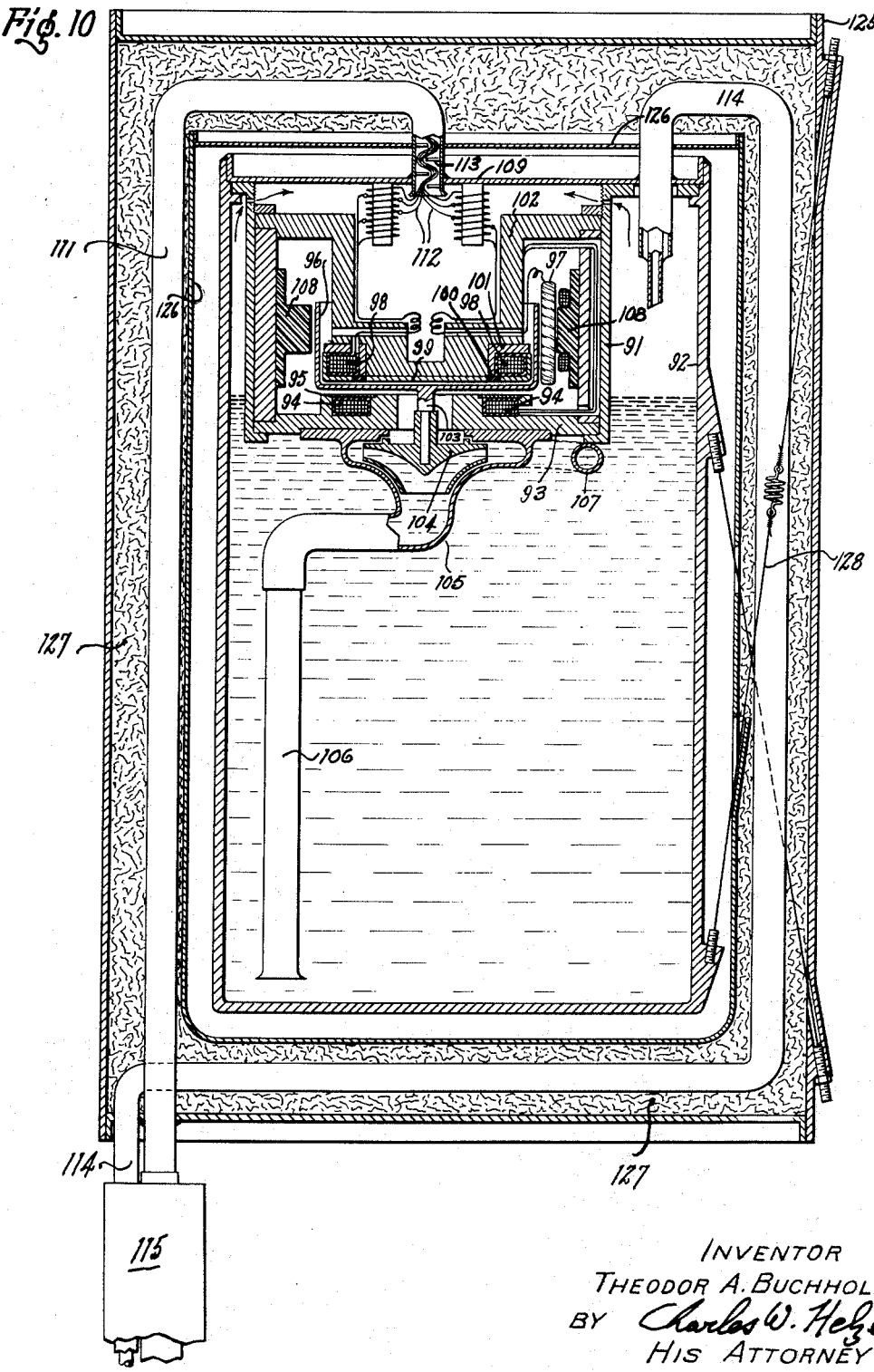
INVENTOR
THEODOR A. BUCHHOLD
BY Charles W. Helzer
HIS ATTORNEY

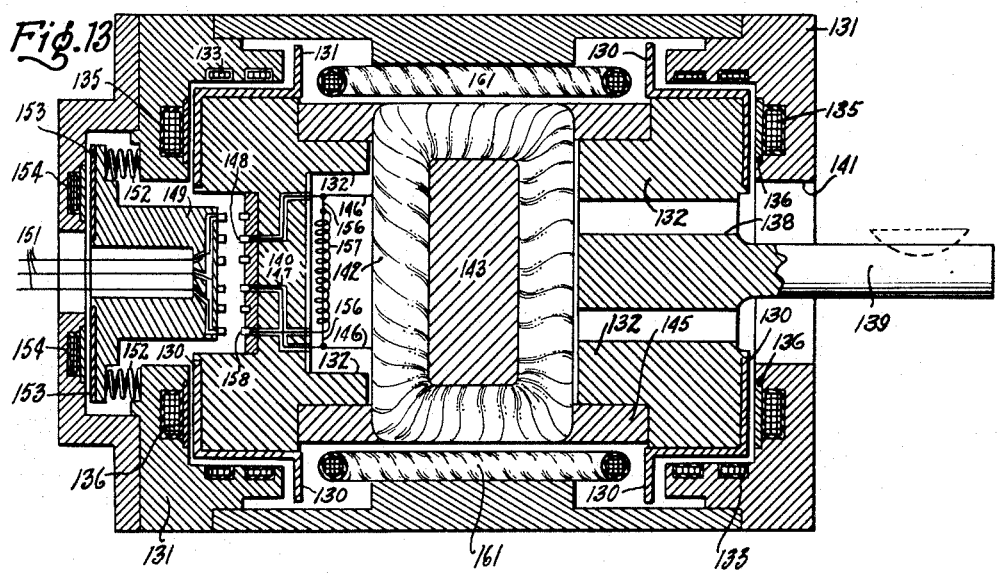
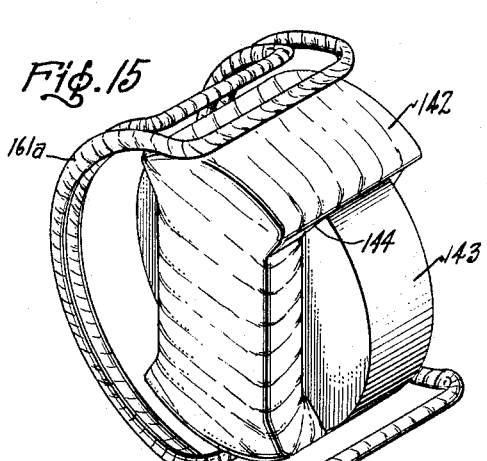
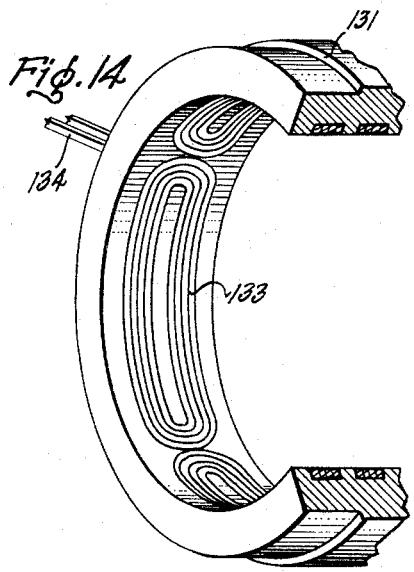
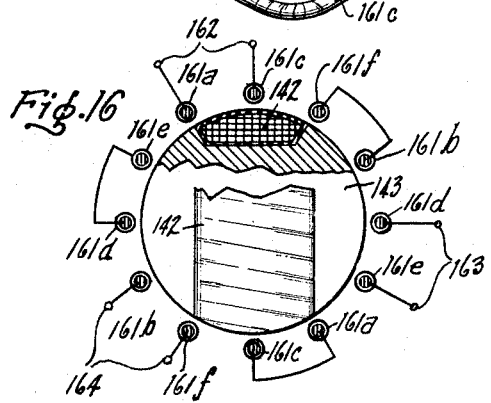
Inventor
Theodor A. Buchhold
by Charles W. Helzer
His Attorney Oct. 17, 1961     T. A. BUCHHOLD     3,005,117
ELECTRO-MECHANICAL DEVICE
Filed March 20, 1959     10 Sheets-Sheet 10
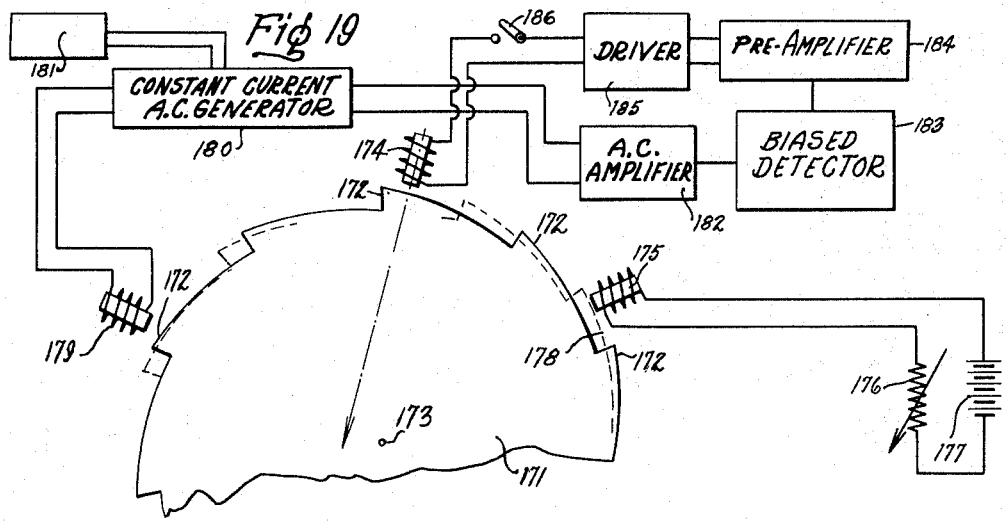
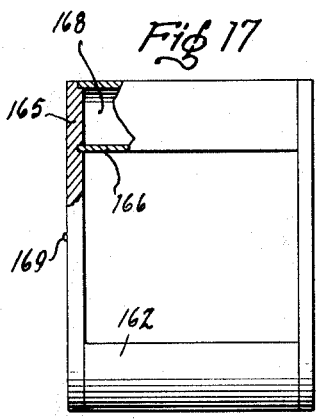
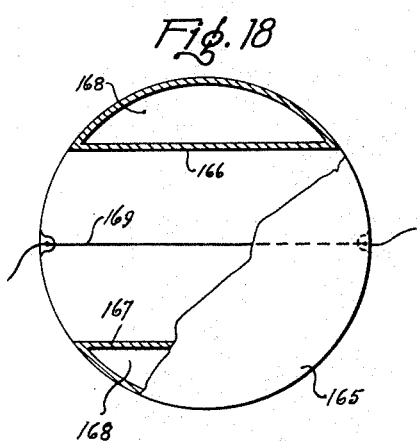
Inventor
Theodor A. Buchhold
by Charles W. Helzer
His Attorney United States Patent Office 3,005,117
Patented Oct. 17, 1961

3,005,117
ELECTRO-MECHANICAL DEVICE
Theodor A. Buchhold, Schenectady, N.Y., assignor to General Electric Company, a corporation of New York
Filed Mar. 20, 1959, Ser. No. 802,592
21 Claims. (Cl. 310—40)

This invention generally relates to improvements in electro-mechanical motors, generators and the like, and although not limited thereto, to such devices particularly suitable for extremely low temperature applications.

Conventional electrical motors and generators are generally unsatisfactory for use in low temperature outer environments or for low temperature application because of the difficulty of providing suitable bearings, lubricants, and other materials that operate properly in the low temperature ranges. Furthermore, such known devices suffer undesirably large energy losses of a mechanical nature from bearing friction and windage together with electrical eddy current heating, all of which dictate to some extent the size and configuration of the device and limit its power handling capacity.

To overcome these disadvantages the present invention provides a novel electro-mechanical construction adaptable as a motor, generator, or the like which employs materials possessing the property of electrical superconductivity at extremely low temperatures. By the use of these materials in the arrangements taught, there is provided electromotive devices which not only operate stably and dependably at temperatures lower than can be tolerated by other known devices but further utilize such low temperature environments in a manner to eliminate electrical losses and all mechanical losses with the sole exception of windage.

It is accordingly one object of the present invention to provide electro-mechanical devices having negligible mechanical and electrical losses.

A further object is to provide such devices capable of dependable and stable operation at temperatures lower than can be tolerated by other known devices.

A still further object is to provide a synchronous motor, generator, motive capacitor, or converter capable of operating efficiently at lower temperatures than any known constructions.

Still another object is to provide such devices possessing the greatest realizable efficiencies.

Other objects and many attendant advantages will be more fully comprehended by those skilled in the art upon a detailed consideration of the following specification taken with the accompanying drawings wherein:

FIGURE 7 is a sectional view depicting one manner of cooling and evacuating the structure;

FIGURE 9 is a functional block diagram of a motor speed control circuit suitable for use with the motor of FIGURE 4;

FIGURE 10 is a sectional view of a cup motor and pump constructed in accordance with the invention;

FIGURE 11 is a sectional view of a heat trap used with the motor and pump construction of FIGURE 10;

FIGURE 12 is a perspective view of the insulating housing used with the motor construction of FIGURE 4;

FIGURE 13 is a sectional view of a wound rotor motor-generator constructed in accordance with the invention;

FIGURE 14 is a perspective view of a partially broken away end portion of the housing of the motor-generator shown in FIGURE 13, and illustrates the bearing construction of the motor;

FIGURE 15 is a perspective view of the rotor and field winding construction of the motor-generator shown in FIGURE 13;

FIGURE 16 is a functional schematic wiring diagram of the stator field winding circuit of the FIGURE 13 motor-generator;

FIGURES 17 and 18 are a side view and end view, respectively, of a substitute rotor member that may be used in the motor-generator of FIGURE 13; and FIGURE 19 is a schematic block diagram of a step motor constructed in accordance with the invention.

This application is a continuation-in-part of application Serial No. 757,836, T. A. Buchhold, inventor, filed August 28, 1958.

In a prior application, Serial No. 709,118, assigned to the same assignee, there is disclosed a stable, low temperature operating superconductive bearing construction for supporting a member completely out of mechanical contact with a support and in such a manner as to substantially eliminate all electrical losses and most of the mechanical losses normally associated with known rotatable bearing constructions. In accordance with the present invention, these bearings are combined with a novel manner of rotating the suspended body and other features to provide an electro-mechanical device of great efficiency and capable of dependable and stable operation at extremely low temperatures.

As is discussed in greater detail in this prior application, certain pure metals become electrically superconductive when their temperature is greatly lowered to a point close to absolute zero. While in this superconductive condition, such materials possess substantially infinite electrical conductivity and substantially infinite magnetic resistance or reluctance preventing the penetration of a magnetic flux therein. Consequently, by directing a magnetic field against such a magnetic insulator, its inability to penetrate the member provides a unique magnetic pressure force which may be used to suspend or float the member. Such a floating suspension not only eliminates mechanical type frictions associated with sliding surfaces but also electrical heating since the lack of electrical resistance completely eliminates eddy current losses that may result from circulating electrical currents. The nature and effect of this unique force differs from the usual magnetic forces and consequently the usual electromagnetic motors, generators, and other constructions cannot be readily applied to employ the unique characteristics of such superconductive materials, and for this purpose means employing the features of the present invention are preferred.

Figure 1:
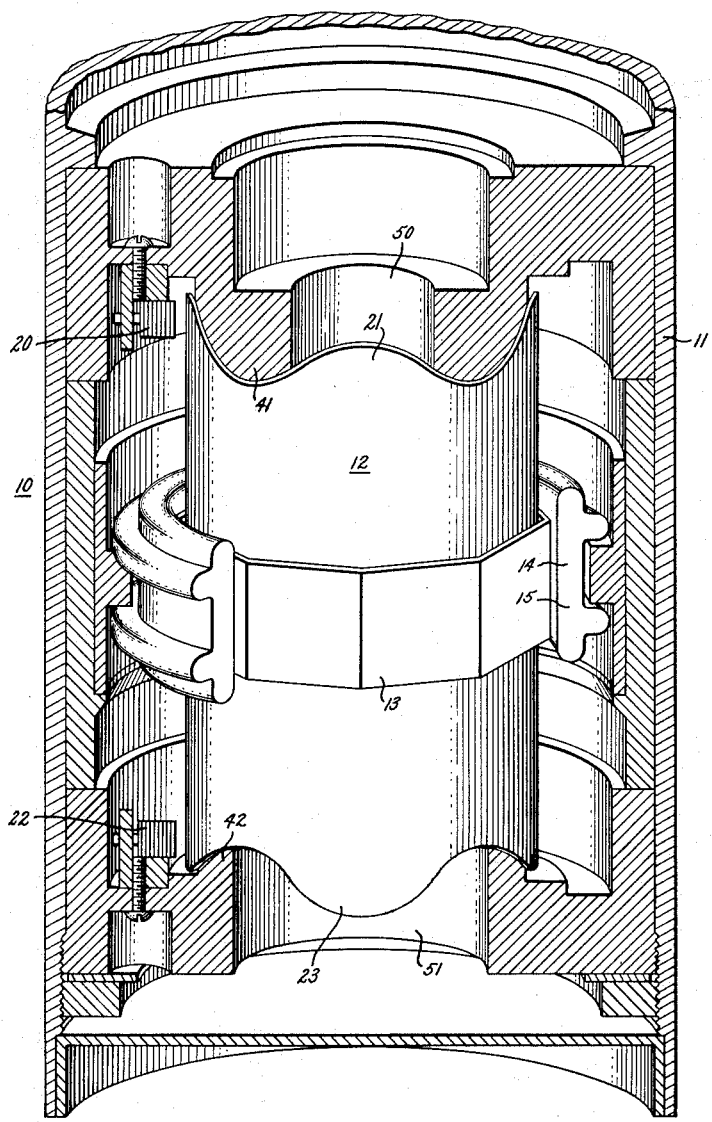
FIGURE 1 is a perspective view, in section, of one illustrative embodiment employing the present invention in connection with a new and improved motor construction.

Referring now to FIGURE 1 for a detailed consideration of one illustrative embodiment employing the present invention in connection with a motor structure generally designated 10, there is shown a a fixed stator housing 11 within which is suspended a generally cylindrically shaped rotor 12 positioned for rotation about its vertical axis. Rotor 12 is fabricated from a superconducting material such as niobium or other of the superconducting materials listed hereinafter, and the housing 11 preferably is fabricated from oxygen-free, high conductivity copper. In one particular embodiment of the novel motor construction, the housing 11 was about 3 inches in diameter and 6 inches in length, and rotor 12 was 1¾ inches in diameter and weighed 69 grams. As will be more fully described hereinafter, rotor 12 is completely suspended or "floating" in space within housing 11 by means of magnetic pressure fields, and is caused to rotate by an armature ring 13 secured about the central portion of the rotor body. Armature ring 13 is formed by suitably fastening by welding or otherwise connecting a series of flat plates together which are fabricated from superconducting materials, and which form a multi-sided kind of polygon band around the central portion of rotor 12, as shown.

Figure 2:
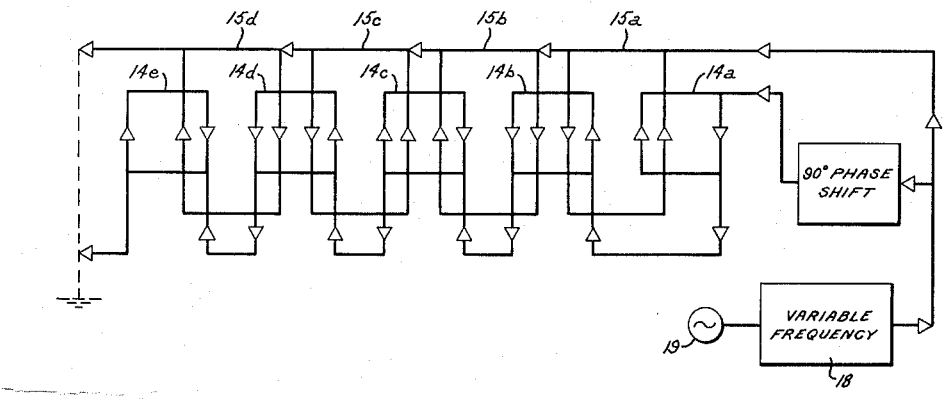
FIGURES 2 and 3 are electrical and magnetic schematics, respectively, illustrating the operation of one driving means using the present invention.
Figure 4:
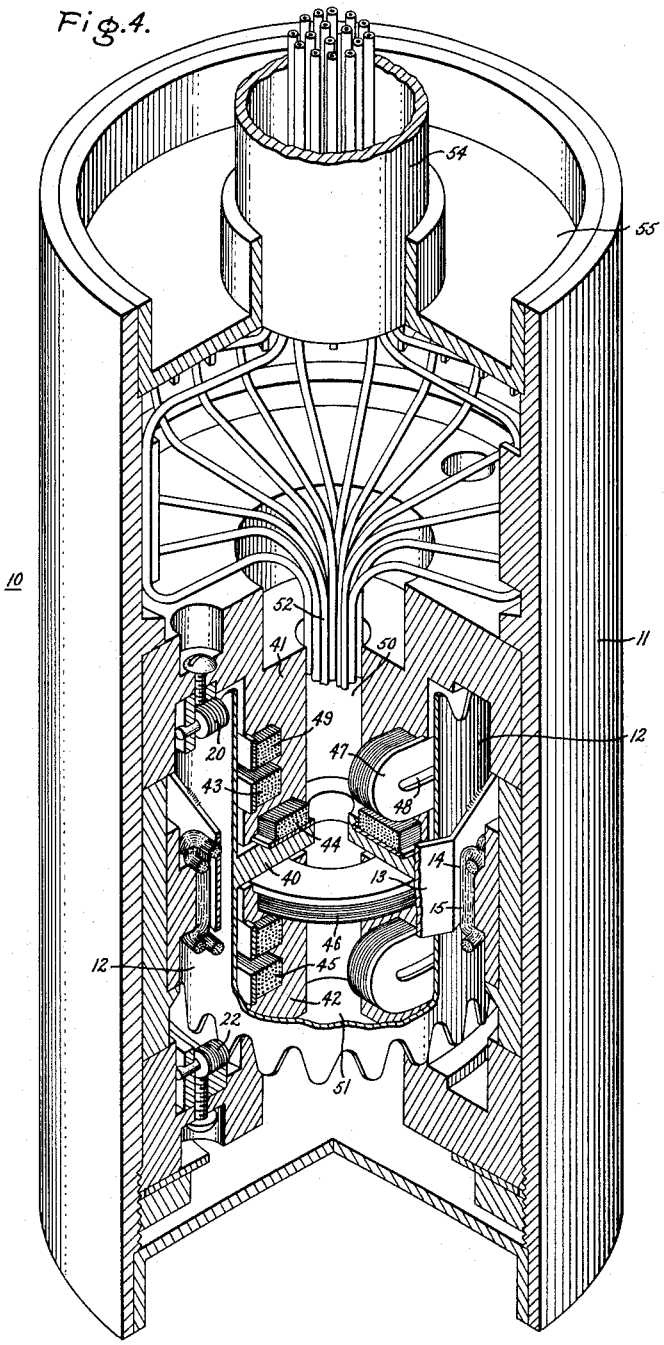
FIGURE 4 is a view similar to FIGURE 1 in greater sectional detail for illustrating a preferred manner of suspending the rotor and other features.

For providing a rotating magnetic field that operates against band 13 to propel rotor 12, there is provided a two phase electrical stator winding formed by the coils 14 and 15, which are concentrically supported within housing 11 to encircle polygon band 13 as best generally shown by FIGURE 4. The stator windings 14 are comprised of a series of interconnected coils 14a, 14b, 14c, etc., with each coil in the series being wound in a direction opposite to that of the next adjacent coil as depicted by the arrows in the schematic diagram shown in FIGURE 2. The stator windings 15a, 15b, 15c, etc., are similarly formed with each coil in the series being wound in the direction opposite to the next adjacent coil in the series with the two phase winding being formed by overlapping the individual coils of the stator winding 15 over adjacent coils of the stator winding 14 in the manner depicted in FIGURE 2. Each of the coils may be formed from about 55 turns to 10 mil diameter formex coated niobium wire, and held in place on an annular shaped base supporting member of a phenolic insulating material by means of a hardened potting compound which may coact with dovetail shaped grooves, etc. (not shown) to retain the stator windings 14 and 15 in position on housing 11. Electric signals for energizing the stator field windings 14 and 15 may be supplied thereto over suitable superconductors (not shown) that may be run up from the bottom of housing 11 through shielded grooves, formed in housing 11 to connect to the windings 14 and 15. As will be explained more fully hereinafter, each of the windings 14 and 15 are adapted to be energized by alternating current signals which are preferably displaced 90 degrees out of time phase, thereby to produce a two phase rotating magnetic field as is well known to those skilled in the motor art. Three phase windings or other multiphase energization may likewise be employed as will be more apparent hereafter, or even a single phase winding provided with suitable starting means if desired. To confine the flux produced by the stator field windings 14, 15 to the immediate area of the armature ring 13, the coil supports for the field windings may have a thin superconductive layer such as niobium foil, shown at 11a, interposed between the coil mount and housing 11.

Since rotor 12 and its band 13 are of superconductive materials and are cooled to extremely low temperatures close to absolute zero, these members possess no electrical resistance and any induced current that is caused to flow therein as a result of the rotating magnetic field generated by windings 14 and 15 is confined to an extremely thin layer near the surface preventing the magnetic flux from enetring the band. Since the magnetic flux cannot penetrate the superconductive material, the rotating field passing about the band 13 exerts an electrical pressure force against the band. However, if the band were cylindrical and the windings 14 and 15 were symmetrically disposed thereabout, this pressure force would be directed inwardly and act upon the rotative axis 16 producing no turning moment to rotate the rotor. In accordance with the present invention, however, band 13 is not cylindrical but suitably formed to present an irregular surface so that a force acting normal to its surface will not be directed toward the rotative axis 16 of the rotor but rather be displaced therefrom, thereby to produce a turning moment tending to rotate rotor 12 about its axis 16. Thus the rotating magnetic field produced by windings 14 and 15 generates a turning moment serving to rotate rotor 12 in synchronism therewith.

Figure 3:
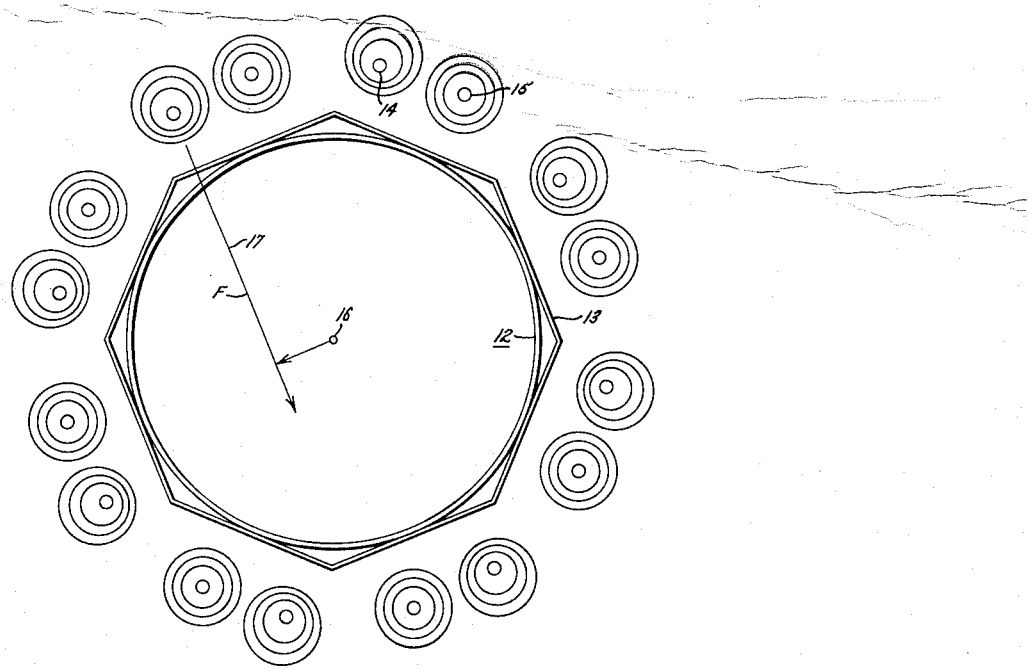

The manner in which the rotating magnetic field developed by field windings 14 and 15 serves to rotate rotor 12 is best understood in connection with FIGURE 3 of the drawings wherein rotor 12 and band 13 are shown in cross section. FIGURE 3 depicts the condition of the motor at the instantaneous period of time when the current in the field windings 14a, 14b, etc., is at a maximum, and the current in the field windings 15a, 15b, etc., lags by 90 electrical degrees. The field windings 14a, 14b, 14c, 14d, 14e, 14f, 14g and 14h are all excited simultaneously by a field control current supplied thereto in a manner to produce an increasing magnetic field as indicated by the surrounding field lines. When thus energized with the rotor 12 in the position shown, the windings 14a, 14b, etc., will produce a turning torque indicated by the vector for the corners of the band 13 which will tend to rotate rotor 12 in a counter-clockwise direction. Concurrently, the field windings 15a, 15b, 15c, 15d, 15e, 15f, 15g and 15h are energized with a signal that is 90 degrees out of phase with the signal exciting the phase windings 14 in a manner to produce a small decaying magnetic field of less magnitude than the field produced by windings 14a, 14b, etc., so as not to oppose the rotation caused by windings 14a, 14b, etc. Subsequently, after rotation of the rotor 12 through half a band segment so as to bring the corners of the band previously under windings 14a, 14b, etc., under the windings 15a, 15b, etc., the phase of the excitation supplied to the field windings reverses so that the magnetic field produced by windings 15a, 15b, etc., is increasing, and the magnetic field produced by field windings 14a, 14b, etc., is decaying. In this manner, rotor 12 is caused to rotate in a counter-clockwise direction synchronously with the rotating magnetic field at a speed dependent upon the frequency of the excitation current supplied to the field windings.

When starting the rotor it is preferred to gradually increase the rotative speed of the magnetic field from a standstill to a desired rate whereby as the magnetic field starts moving rather slowly and gradually increases speed, the rotor follows without slippage. This gradual starting is achieved in one preferred manner by initially energizing windings 14 and 15 by a low frequency alternating current source generated by means of a variable frequency control 18 (FIGURE 2) and then progressively increasing the energiing frequency to accelerate rotor 12 until it reaches a desired speed. Once this is obtained the power being supplied to windings 14 and 15 by source 19 may be reduced to only that necessary for driving the load and to overcome windage effects since neither mechanical friction nor electrical losses are present to impede rotor rotation.

If it is desired to automatically start the motor and bring it to a desired constant speed, a follow-up system employing what may be termed an alternating current commutator may be used as best shown by FIGURES 1 and 4. In this arrangement, each of the two-phase stator windings 14 and 15 is energized by a variable frequency signal which is made proportional to the speed of rotation of the rotor member, with the signal energizing one phase winding being displaced preferably 90 electrical degrees from the electrical signal energizing the second phase windings. Consequently, as rotor 12 increases speed, the speed of rotation of the magnetic field driving the rotor also increases in step until the rotor is brought to the desired speed as a result of the load and the windage effects. A motor control circuit for use in this manner is shown in FIGURE 9 and includes a high frequency oscillator 81 having its output connected in parallel to a pair of bridge circuits 82 and 83. The bridge circuit 82 includes a speed pickup coil 20, to be described hereinafter, as one arm, and has its output connected through a carrier frequency amplifier 84 and detector and filter circuit 85 to a rotor speed amplifier 86. The detector-filter circuit 85 is of the frequency discriminator type which develops an output electric signal representative of the speed of the rotor 12. This signal is then amplified by rotor speed amplifier 86 and supplied to phase winding 14. The pickup 22 is physically displaced from pickup 20 a distance required to develop a signal 90 electrical degrees out of phase with respect to the signal developed by pickup 20, and is connected as one arm of the bridge circuit 83. Bridge 83 has its output connected through a carrier frequency amplifier 87, a frequency discriminator circuit 88 and a rotor speed amplifier 89 to the phase winding 15. The two phase windings 14 and 15 then coact to bring rotor 12 up to speed in the above described manner. Upon reaching the desired speed the amplitude of the excitation signals supplied by oscillator 81 may be reduced to a value sufficient only to overcome windage losses and the like. If desired this may be done automatically by means of a frequency comparator circuit, or manually To obtain an electrical signal whose frequency is proportional to the rotor speed, a first magnetic or other type pickup member 20 is preferably supported by the housing 11 proximate the upper scalloped edge 21 of rotor member 12 as shown by FIGURE 1. This rotor upper edge 21 may be scalloped as shown to sinusoidally vary the portion of the metal rotor detected by pickoff 20. Hence, pickoff 20 provides a sinusoidal or alternating current output signal as rotor 12 revolves whose frequency is in proportion to the speed of the rotor. In other words, the output frequency of pickoff 20 is proportional to the number of scallops 21 of rotor 12 which passed by it for each unit of time. This alternating current signal may then be amplified and directed to energize one of the two-phase stator windings, such as 14 to furnish one phase of the driving magnetic field. A similar alternating current signal, displaced preferably 90 electrical degrees from the first phase signal, may be generated by a second pickoff 22 positioned proximate the sinusoidally scalloped lower edge 23 of rotor 12, and the electrical signal generated by this pickoff may be similarly amplified and directed to energize the second phase winding 15.

For greater sensitivity, it may be preferred to use two upper and two lower pickoffs for each phase (not shown) with the pickoffs of each pair being physically displaced 180 degrees referenced to the scalloped edges. Each of upper pair detect the position of the rotor by means of the upper scalloped edges, and when one upper pickoff generates a signal of maximum value, the second upper pickoff generates a signal of minimum value due to its displacement of 180 degrees with respect to the sinusoidal undulations of the rotor edge. By electrically connecting these pickoff signals in a Wheatstone or similar bridge type circuit as is known in the art, a more sensitive signal proportional to the speed of the rotor may be generated.

Figure 5:
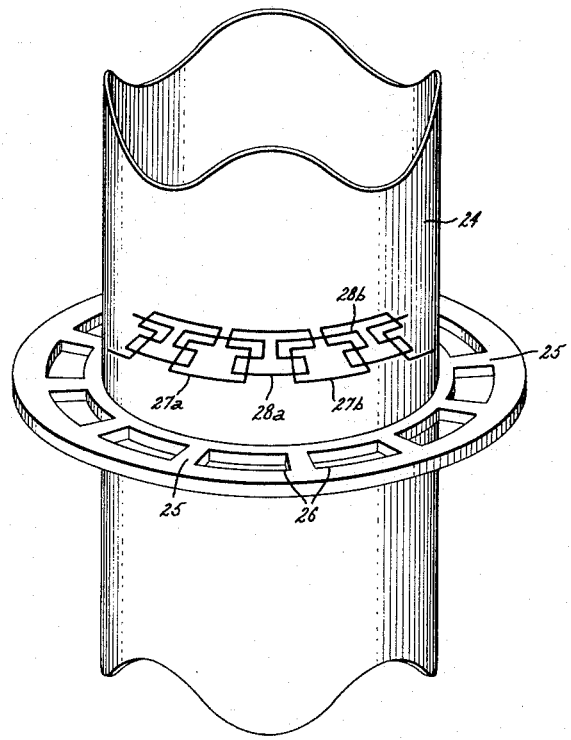
FIGURES 5 and 6a are perspective views of an alternative rotor construction and FIGURE 6 is a magnetic schematic for illustrating its operation.
Figure 6:
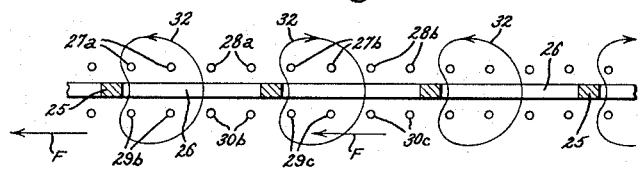

FIGURE 5 illustrates an alternative rotor construction and drive means in accordance with the present invention. In this modification, the rotor is comprised of a cylinder 24 having a brim 25 outstanding about its central portion in which a series of windows or openings 26 are formed therein as shown. In a particular embodiment of this rotor construction, the brim is about ½ inch wide and about ⅛ inch thick with the windows being approximately ⁹⁄₁₆ inch by ⅜ inch. Positioned above and in confronting relation with brim 25 are a first series of interconnected windings 27a, 27b, etc., and a second series 28a, 28b, etc., with the windings of the second series being physically displaced in phase from the first series to provide a two phase system. A second two series of identical windings may be similarly positioned below the brim, as best shown by FIGURE 6. Although not shown, windings 27, 28, 29 and 30 are preferably affixed within a stator and it is assumed that rotor 24 is movably supported for rotation about its vertical axis in a manner similar to the rotor of FIGURE 1.

By energizing the two phase windings by time phase displaced alternating current sources, a two phase rotating magnetic field is produced that generates a magnetic flux 32 entering and leaving each opening 26 of brim 25 but which cannot enter the solid portions of the brim because of its superconductive condition as generally illustrated by FIGURE 6. Since the flux cannot penetrate the solid portions, as the magnetic field rotates clockwise, for example, about brim 25, flux 32 is concentrated at the left hand edge of windows 26 and a force is produced tending to turn the brim and rotor to the left, as shown by FIGURE 6.

For a more complete understanding of this operation, reference is made to FIGURE 6, and it is assumed that the armature windings are mechanically moved from right to left by an appropriate starting circuit. As these windings are moved, the magnetic flux lines 32 cannot enter the superconductive solid portions of brim 25, but can only pass through opening 26, and consequently are compressed at the left edge of openings 26 and thinned out at the right edge. Compression of the magnetic lines produces a magnetic "pressure" force operating against the left edges of the brim openings 26 tending to turn the brim in the same direction as movements of the windings and in synchronism with such movement. Consequently if the two phase windings are actually affixed to a stator member but the flux generated thereby is rotated in a manner well known to those skilled in the art, the effect is the same; and magnetic pressure forces are exerted against the left hand edges of the brim openings tending to turn the rotor in synchronism with movement of the magnetic field.

Figure 6D:
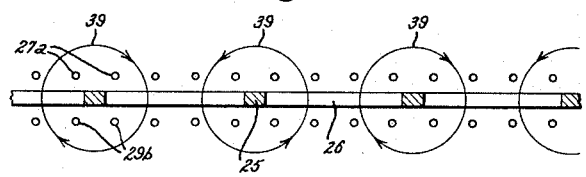
FIGURE 6d illustrates a modification of FIGURE 5 to provide the operating characteristics shown by FIGURE 6c.
Figure 6A:
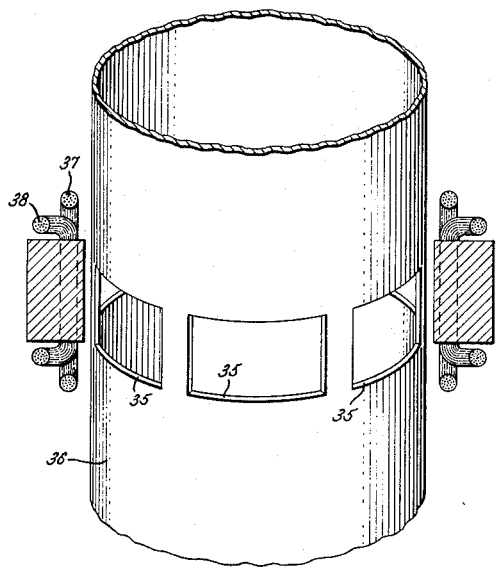

FIGURE 6a illustrates another embodiment quite similar to that of FIGURE 5 except that the window openings 35 are formed directly through the body of a rotor 36 and the multiphase windings 37, 38 are positioned upright and about the rotor to confront the window openings 35. The operation of this modification is substantially the same as that of FIGURE 5.

It is believed evident from a consideration of the differing rotor construction discussed above that the electromagnetic driving means of the present invention differs from any of the conventional type motor in that it functions as a result of the magnetic insulation properties of a superconductive material together with the provision of means provided on the rotor body to provide points of flux compression or increased magnetic pressure areas to provide the necessary turning forces. Consequently many variations in rotor construction may be made by those skilled in the art without departing from the spirit and scope of the present invention.

Figure 6B:
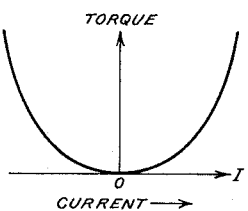
FIGURES 6b and 6c are charts depicting the torque-current characteristics of induction type and synchronous type motors.

In the modifications described above the torque being generated by the magnetic pressure force varies as the second power of the field current. That is, it experiences very little change in torque with variations in the low current range but much larger changes with current variations when operating in the range of larger field currents as best shown by FIGURE 6b. For many applications, however, it is desired that the torque vary linearly with change of current over a wide range as illustrated by FIGURE 6c, and similar to the characteristics of the usual synchronous type motor.

Figure 6C:
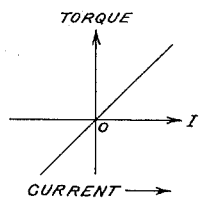

To obtain these different characteristics by means of the present invention, the brim member 25 of the modification shown by FIGURE 5 may be provided with a plurality of permanent electromagnets whereby the reaction between the permanent magnet rotor brim and the rotating magnetic field operates to provide a linear change in torque with variation in field current as depicted by FIGURE 6c.

To provide rotor 24 with such permanent electromagnetic poles, the rotor structure of FIGURE 5 may be employed and energized as shown by FIGURE 6d. In this modification the solid portions of brim 25 are initially positioned at standstill to link with winding 27a, b, etc., and the temperature of brim 25 is sufficiently raised so that the material is not in its superconductive condition. Windings 27 and 29a, b, etc., are then energized by a direct current to produce a flux 39 which may now penetrate brim 25 since it is not superconductive. The temperature is then lowered until brim 25 again becomes superconductive and the direct current through windings 27 is reduced to zero. Reducing the current serves to induce a circulating current in brim 25, and rendering brim 25 again superconductive serves to "entrap" the circulating electrical current within the now superconductive brim to provide a resistanceless path for the circulating current. Thus the rotor is provided with a brim 25 having a series of permanent electromagnets thereabout. Consequently as the field windings 27, 28, 29 and 30 are later energizing by a multiphase A.-C. source, a synchronous motor is provided having a linear torque-field current characteristic as shown by FIGURE 6d.

This permanent electromagnetic modification is, of course, not limited to motor applications alone, since if rotor 24 is independently driven, the magnetic flux of the permanent electromagnets cuts the windings of the field coils to generate a voltage and to serve as a generator. Furthermore, this modification may be employed as a synchronous capacitor, if desired. By employing one such device as a motor that is mechanically coupled to drive the rotor of a second similar device being used as a generator and having a different number of poles, the combination will also serve as a frequency converter, as it is now believed evident to those skilled in the art.

*Floated suspension*

For supporting the rotor member within the stator structure in a manner to completely eliminate friction, as best shown by FIGURE 4, the rotor 12 may be cylindrically shaped and open-ended, as shown, and having a wall 40 dividing the interior of this hollow cylinder into upper and lower sections. Projecting downward into the upper of these sections is a confronting stator pole member 41 supporting permanent electromagnets, and projecting upward into the lower section is a second substantially identical pole member 42, with both stator poles serving to completely float rotor 12 out of contact with the poles.

The upper pole member 41 supports a series of permanent electromagnets 43 concentrically arranged about the outer periphery of the pole to exert lateral forces against the inner surface of hollow rotor 12 together with a vertically arranged permanent electromagnet 44 to provide a vertical downward force upon the cylinder wall 40. Similarly, the lower pole member 42 may support a series of permanent electromagnets 45 concentrically arranged about the outer periphery of the pole to exert lateral forces about the inner surface of the rotor together with a vertically arranged permanent magnet 46 to provide a vertical force acting upwardly upon the wall 40 dividing the rotor. By means of these permanent electromagnets, rotor 12 is completely supported or "floated" by the electrical pressure forces of the present invention in both the lateral and vertical directions. The pole members 41 and 42 are both fabricated from copper to provide good heat conduction paths and is shielded from stray magnetic fields by a magnetic shield formed from niobium foil or other suitable superconducting material which surrounds the exposed portions of the pole members 41 and 42 in the vicinity of the pickup coils to reduce the effect of leakage flux. As shown in FIGURE 4, there are four lateral electromagnets 43 in the upper series of bearing coils, each of which may be preferably formed of a unitary ring 47 of superconductive material having a slitted opening 48 passing through its center. Each of the bearing plates 47 is energized by an associated bearing coil 43 formed from about 126 turns of 10 mil diameter formex coated niobium wire. The superconductive plate 47 is disposed immediately over its associated coil 43 in flux linking relationship, and the face confronting rotor 12 is approximately ¾ of an inch wide and ⅜ of an inch high. The vertical bearing coil 44 is fabricated in substantially the same manner using 340 turns of 10 mil diameter formex coated niobium wire in shaping the energizing coil. If desired, the superconductive plates 47 for each of the four upper lateral stabilizing coils 43 may be formed together out of an annular belt of superconducting material having cut-out portions corresponding to the openings 48 to allow flux linkage through the coils. It is also desirable that the coils 43 be secured within iron holders 49a which in turn are bolted or otherwise secured to the supporting members 41, and which provide an increased flux linkage between the turns of the coils 43 and the superconductive plates 47.

In order to energize the lateral stabilizing coils 43, it is desirable that all of the coils be connected in parallel circuit relationship to source of direct current electric energy which may include a rheostat for controlling the magnitude of the current supplied to the bearing coils. After being thus energized, a magnetic bearing flux may be trapped in the bearing coils, if desired, by means of a cryotron gate element (not shown) that short circuits the turns of the coils when allowed to become superconductive. In the preferred construction however, the bearing coils will be continuously energized from a separate source of direct current power in the manner mentioned above.

The lower series of permanent electromagnets, generally designated 45 and 46, are similar in construction to the upper permanent electromagnets 43 and 44 and the net effect of the upper and lower series is to centrally float cylindrical rotor 12 within the housing about its lateral axis. It is desirable however that separate controls be provided for controlling the vertical stabilizing bearing coils 46 and the lateral coils 45.

In the vertical direction, the upper pole member 41 carries at its base the electromagnet 44 and the lower pole carries a similar electromagnetic bearing 46 as shown. These upper and lower permanent electromagnets 44 and 46 may, if desired, be merely single ring constructions similar to that depicted above.

Assuming a bearing coil 43 to be constructed in the above identified manner, and ignoring for the time the effect of its associated superconductive bearing plate 47 which serves to capture the magnetic flux produced by the bearing coils and hence merely reproduces the results of the bearing coil 43, then the force $F_s$ produced by each bearing coil against a bearing surface is given by the equation $$F_s = \left(\frac{B}{5000}\right)^2 \text{ in kg./cm.}^2 \qquad (1)$$

where B measured in gausses is approximated from the expression $$B = \frac{.4\pi NI}{l}$$

with N being the number of turns of the coil, I the current in amperes flowing through the coil, and $l$ in centimeters the width of the annular face of the coil which confronts the bearing surface.

With a superconductive magnetic bearing of the nature described, the magnetic pressure of the coil carries the weights of the bearing surface it supports. The manner in which this is accomplished can be best appreciated from a consideration of the fact that the flux $\phi$ linked with the coil 43 will stay constant since the coil is superconductive, and has zero resistance in accordance with the following expression $$\frac{d\phi}{dt} = IR = 0$$

hence $\phi$ is a constant.

Accordingly, if the rotor 12 or other superconductive bearing surface moves relative to the bearing coil 43 to reduce the spacing or gap width therebetween, the rotor flux $\phi$ remains constant; hence, the flux density B must increase to thereby increase the pressure force on the superconducting bearing surface.

For further details covering the construction and operation of the permanent electromagnet bearings, reference is made to copending application Serial No. 709,118 assigned to the same assignee.

For energizing each of the permanent electromagnetic bearings, as well as the stator field windings, 14 and 15, each of upper and lower poles 41 and 42 may be provided with openings 50 and 51 therethrough permitting electrical wiring 52 to pass through the stator structure and upwardly through an evacuation tube 54 passing through the upper ceiling 55 of the stator so that the rotor structure may be completely enclosed and sealed as shown by FIGURE 7. To further insure against transmission of heat developed by an $I^2R$ losses in the leads 52 and to insure against heat conduction by these leads into the motor housing, the ceiling 55 forms an additional heat sink for absorbing such heat prior to its transmission into the motor housing. To further eliminate or materially reduce windage effects, the interior of the motor may be evacuated by means of a vacuum pump 56 to substantially completely evacuate the air existing between the movable rotor and stator structures within the sealed motor construction, and, if desired, a low order invert atmosphere may be introduced.

Since the temperature of all of the superconductive materials must be cooled to superconductive temperatures in the order of a few degrees above absolute zero Kelvin, the complete sealed motor structure 10 is preferably placed within an insulated outer container 57 and cooled by means of a pump 58 which supplies liquid helium 59 or the like, to the container to completely immerse the motor. In the case of remote areas of the motor, or relatively confined spaces it may be desirable to insert gaseous helium into housing 10 perhaps through tube 54, then placing the gaseous helium under pressure to liquefy it and thereby rapidly reduce the temperature of the portions of the motor it surrounds. Subsequently, the space would again be evacuated to remove the helium.

Figure 8:
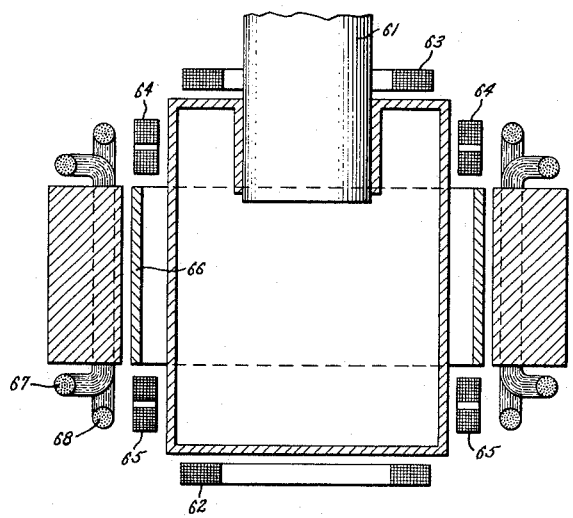
FIGURE 8 is a sectional view depicting alternative rotor and bearing construction.

FIGURE 8 illustrates another structure employing the present invention in which the magnetic pressure bearing arrangement is varied. In this modification, the magnetic pressure bearings are all positioned outside of the confines of a spherical or cylindrical rotor member 60, which may be hollow, as shown, and supporting a vertically positioned drive shaft 61, adapted to project outside of the motor housing (not shown).

More specifically, the rotor member is vertically supported by a lower magnet bearing 62, positioned underneath and by a similar upper magnet bearing 63 positioned above; and in the lateral directions by a series of circumferentially extending magnet bearings 64 about its circumference at its lower portion thereof.

To complete this rotor, a multisided polygon shaped armature 66 is preferably fastened to outwardly extend circumferentially about the central portion of the rotor body and be positioned intermediate the upper and lower lateral bearings 64 and 65, as shown.

In addition to supporting the magnet bearings 62, 63, 64, and 65, the stator housing (not shown) may also carry the multiphase electrical field windings 67 and 68 centrally about the rotor armature 60 in confronting relation to the armature to react therewith in a manner as discussed above in connection with FIGURES 1 and 4.

By providing a permanent electromagnet armature in the manner of FIGURE 6d, this modification may also serve as a generator to provide an electrical voltage output from stator windings 67 and 68 in response to an external torque being applied to turn shaft 61.

In accordance with the teaching of the present invention, it is desired to eliminate all losses whether of a mechanical or electrical nature and to provide a substantially lossless electro-mechanical device, which in the form of a motor, for example, may be accelerated to a desired speed, and after being electrically de-energized, will continue to rotate at such speeds for a substantially indefinite time in the absence of external loading; or alternately, in the event of loading, will require only such energization as dictated by the load requirements and by the effects of windage. Accordingly all portions of the device being acted upon or in the presence of the magnetic fields supplied by the armature or stator winding or by the magnetic pressure bearings, are preferably formed of superconductive materials sufficiently cooled to reach a superconductive condition.

The term "superconductive state" or "superconductive condition" as used throughout this specification and claims denotes a condition of absolutely no electrical resistance, insofar as any known measuring means have been able to determine, and the use of the term "superconductive material" includes not only solid members which are wholly comprised of material possessing this unique characteristic but includes members that may be comprised of nonsuperconductive materials such as copper or iron, provided with an outer thin layer or covering of superconductive material. For example, rotor 12, armature band 13, and the bearing together with others of the disclosed members discussed above may all be constructed of common inexpensive materials over which is blanketed a thin layer of niobium or other superconductive material. Since one of the unique characteristics of a superconductive material is that any electrical current flows very close to its surface, an extremely thin outer layer of superconductive material provides the necessary path of infinite conductivity and infinite magnetic resistance. Actual measurement has shown that this layer in most instances need be no thicker than (.0001) $\frac{1}{10000}$ of an inch, since substantially all current flow is this close to the surface, however, it is obvious that thicker layers may be applied with the same result.

It has been found that twenty-one different metallic elements and a large number of alloys become superconducting at varying temperatures for each material at temperatures as low as .35° Kelvin for the material hafnium up to about 8° Kelvin for niobium. Some alloys have been found to possess even higher superconductive state temperatures, the highest presently known being about 15.5° Kelvin for the compound niobium nitride, or niobium tin which is superconducting at 18° Kelvin. The known superconductive elements in the periodic system are Al, Zn, Ga, Zd, In, Sn, Hg, Tl, Tb, Ru, Re, Os, U, Th, Hf, Ta, Zr, Nb, B, Ti, and La. Also, many superconductive compounds of these materials are known, such as niobium nitride discussed above, as well as some compounds comprised of elements which are not in themselves superconductive.

It is to be particularly emphasized that no known motor, generator, or equivalent structure is capable of dependable and stable operation at the extremely low temperatures contemplated by the present invention. Moreover, only at these low temperatures can the full utilization of the superconductive properties of certain materials be obtained in the manner taught by the present invention. Furthermore, once these characteristics are obtained in the manner taught, substantially all losses normally associated with such devices are completely eliminated with the end result of greatly increased efficiency and considerably smaller structure that would otherwise be needed for handling the same power requirements.

A second species of a new and improved motor construction manufactured in accordance with the invention is shown in FIGURE 10 of the drawings, and includes an outer motor housing 91 which may be fabricated from copper, iron or from a superconducting material such as niobium or niobium tin. The outer housing 91 is supported from the top of an inner container 92 which holds a supply of liquid refrigerant such as liquid helium for reducing the temperature of the components within the container to the neighborhood of 4° Kelvin. The housing 91 includes an underlying bottom portion 93 which supports an annular shaped magnetic lower bearing coil 94 formed from 600 turns of 5 mil diameter insulation coated niobium wire. An annularly shaped superconductive bearing plate 95 is disposed over the coil portions 94 for trapping flux generated by the coil in the manner described hereinbefore with respect to the motor shown in FIGURE 1. The magnetic bearing coil 94 and superconductive bearing plate 95 serve to develop a magnetic bearing flux which supports cup-shaped motor armature 96 for rotation about a vertical axis within the housing 91 completely out of mechanical contact with the housing. The cup-shaped armature 96 is fabricated from a superconductive material such as niobium, and has a plurality of windows formed about its circumference in the manner of the species of the invention shown in FIGURE 6a of the drawings whereby flux developed by a two phase stator field winding indicated at 97, causes the armature 96 to be rotated. Additionally, the field flux developed by the two phase stator field winding 97 develops a magnetic pressure against the superconductive surface of the cup-shaped armature 96 which tends to keep the armature centered about its rotational axis. In order to keep the armature from being lifted upwardly by the magnetic pressure force of the lower bearing coil 94, an upper magnetic bearing coil 98 is provided. The upper magnetic bearing coil 98 is made up of 350 turns of insulated 5 mil diameter niobium wire covered by a disk-shaped superconducting plate 99 having non-superconducting isolating portions 100 which divide it into a split annular ring and center disk to prevent the development of circulating currents over the entire surface of the superconducting bearing plate and hence maintain the magnetic flux produced by the magnetic bearings in a localized area. The upper bearing coils 98 are secured within an annular shaped iron core member 101 which in turn is supported from an inner housing 102 that is secured at its outer upper edge to the outer housing 91 by a threaded coupling, welding or otherwise. The upper bearing coil 98 together with the lower bearing coil 94 then serve to floatingly support the cup-shaped armature member 96 therebetween for rotation about its vertical axis by the magnetic field flux developed by the stator field winding 97. The rotatable armature 96 has a post 103 formed integrally with it along an axis passing through the center of the cup-shaped armature 96 to which is secured an impeller 104. The impeller 104 is adapted to be rotated within a pump housing 105 having an axial inlet connected through an inlet tube 106 down to fluid in the bottom of the inner container 92, and having a circumferentially disposed radial outlet tube 107. The impeller 104 and pump housing 105 comprise a centrifugal pump adapted to move liquid helium or other liquid refrigerant contained within the container 92 from the bottom of the container 92 up to the top thereby assuring uniform distribution of the liquid refrigerant, and preventing stratification of the refrigerant layers within the housing 92. The stator field winding 97 comprises a two phase field winding substantially identical to that described with relation to FIGURES 2 and 3 of the drawings, and hence will not be again described in detail. The two phase stator field winding 97 is supported on an insulating backing member 108 formed from a laminated phenolic or other suitable insulating material, which is in turn secured to an extension from the walls of the housing 91. The inner housing 91 may be closed by a lid 109, and the interior of the housing 91 evacuated through a vent pipe 111. The vent pipe 111 also serves as a conduit for the electrical lead wires indicated at 112 which are required in order to energize the stator field winding 97, and the upper and lower magnetic bearing coils 94 and 98. These lead wires may be led through a suitable baffling arrangement indicated at 113 which reduces to a minimum heat influx to the interior of the housing 91 through vent pipe 111. The conductors 112 are formed from superconducting material and are connected to each of the elements that they energize through suitable shielded conduits that serve to minimize magnetic fields developed thereby so as not to adversely affect the operation of the motor. In addition to providing a passageway for the electrical lead wires 112, the vent pipe 111 may serve to connect the interior of the housing 91 to a vacuum pump so as to evacuate it if desired. To further reduce any heat influx into the interior of the housing 91 through the vent pipe 111, a heat trap indicated at 115 may be included in the vent pipe 111. Liquid helium, or other suitable liquid refrigerant required to reduce the temperature of the superconductive parts of the motors to the neightborhood of 4° K., is introduced into the inner container 92 through a coaxial dual conduit 114.

The details of construction of the heat trap 115 are shown in FIGURE 11 of the drawings wherein it can be seen that the heat trap 115 comprises an outer coaxial conduit 121 and inner conduit 116 which is connected directly to the vent pipe 111. The inner conduit 116 is centrally disposed within a tub-shaped shield 117, and has its lower end connected through an outlet 118 to an evacuating pump, and to a plurality of electrical conductor lead-in terminals 119 which provide a vacuum tight insulating connection for the lead-in wires to the conductors 112. Disposed adjacent to the central inner conduit 116 is a section of the liquid supply line 114 which also passes through the outer tub-shaped shield 117 for the purpose of minimizing heat losses of the very low temperature liquid helium being supplied through the conduit 114. The inner container 116 and supply pipe 114 extend up into a second surrounding outer conduit 121 which is adapted to contain a low temperature liquid refrigerant such as liquid nitrogen. This liquid refrigerant is introduced into the space between inner and outer conduits 116 and 121 through a retractable supply line that is inserted through a vent opening (not shown) into this space. By this arrangement, the temperature of the inner conduit 116 which is connected to the vent pipe 111 and the liquid supply pipe 114 is reduced down to a point where there will be less difference in temperature between these parts and the low temperature environment within the inner container 92 to which they are connected. To further insure against heat influx into the inner container 92 through conduit 111, the lead-in wires 112 may be wound around heat sinks indicated at 122 which are of course maintained at a low temperature by the liquid nitrogen contained in the outer conduit 121, and are threaded past a series of baffles 123 which minimize radiation from the surfaces of the heat sinks 122 up through the inner conduit 116.

In order that the arrangement just described may be physically located within an environment at normal room temperature, the inner container 92 and sections of the vent pipe 111 and supply conduit 114 are supported within an outer container 125 which may be fabricated from stainless steel or other material capable of with-standing evacuation. The outer container 125 surrounds a median container 126 which is supported within the outer container 125 by a layer of glass fiber insulation 127 that entirely surrounds the median container 126 and serves to insulate it from the outer container 125. Inner container 92 is supported within median container 126 in a manner such that the space between the inner container 92 and median container 126 is void, and may be evacuated through a suitable opening, not shown. The inner container 92 is rigidly supported within median container 126 by means of a network of thin stay wires 128 which rigidly secure the inner container 92 to the outer container 125 and pass through openings in the median container 126. The thin stay wires 128 serve to rigidly hold the inner container 92 by reason of their interaction in the manner shown by the schematic force diagram of FIGURE 12 of the drawings. From an examination of FIGURE 12 it can be determined that one set of thin stay wires 128 extend from a point on the lower portion of inner container 92 to an upper surface of the outer container 125. Another set of thin stay wires 128 extend from a point on the upper surface of inner container 92 to a lower surface on the outer container 125. By this arrangement the inner container 92 may be firmly and rigidly supported within the outer container 125 and median container 126, and yet not provide any high conductivity heat path between the two containers which are at widely different temperatures. The points where the thin stay wires 128 pass through the median container 126 also serve to provide access to the space between the median container 126 and the outer container 125 where the glass fiber insulation is located. This construction allows the space between containers 125 and 126 to be evacuated to a certain extent, and further improve its heat insulation qualities. For a more detailed description of the construction and operation of the thermal insulating housing formed by the outer container 125, median container 126, and inner container 198, and the network of thin stay wires 128, reference is made to copending application Serial No. 791,953, filed February 9, 1959, T. A. Buchhold and K. F. Schoch, inventors, entitled "Insulating Housing," assigned to the General Electric Company.

The operation of the motor shown in FIGURE 10 believed to be obvious in the light of the description of the FIGURE 6a motor, and hence will not be again described in detail. The magnetic bearing coils 94 and 98 coact to maintain the cup-shaped armature 96 in floating rotating position, while the two phase rotating magnetic field developed by the stator windings 97 coacts with windows in the cup-shaped armature 96 to synchronously drive the armature up to a desired speed determined by the speed control circuit used with the motor. For this purpose, the speed control circuit shown in FIGURE 9 is suitable for use with the motor of FIGURE 10. It should also be understood that the motor and pump arrangement shown in FIGURE 10 is adapted to be included in a common container with another device where it is desirable that the liquid refrigerant be circulated to avoid temperature gradients due to stratification.

A combination motor-generator constructed in accordance with the teachings of the present invention is shown in FIGURE 13 of the drawings. The motor-generator shown in FIGURE 13 comprises a wound rotor motor-generator as distinguished from the preceding motor constructions which utilize the reaction effect of a rotating magnetic field on a superconducting surface to produce synchronous rotation of the rotor. The wound rotor motor-generator of FIGURE 13 is designed to operate at superconductive temperatures and of course must be supported within a refrigerated space in a manner similar to the previously described motor constructions. The motor includes an outer housing 131 which may be generally cylindrical in shape and fabricated from a material such as iron. A cylindrically shaped rotor 132 is rotatably supported within housing 131 by a plurality of magnetic bearing rings 133 which surround the rotor 132 within housing 131. The construction of the magnetic bearing rings 133 is best illustrated in the perspective view of FIGURE 14 of a part of the outer housing 131. Each of the journal bearings 133 comprises a small number of turns (4 to 10) of relatively thick 40 mil square superconductor wire formed in the shape of a loop and embedded in the outer housing 131. The turns of superconducting bearing coils 133 are of course insulated from each other by a suitable insulating cover such as Formex, and are insulated from the housing member 131. There are four such magnetic bearing coils 133 spaced equidistant about the periphery of the housing 131 at each of its ends. These magnetic bearing coils coact with super-conducting surfaces 130 secured to the rotor member 132 to floatingly support the rotor member out of mechanical contact with the housing member 131 in a manner described hereinbefore. The magnetic bearing coils 133 have suitable lead-in conductors indicated at 134 in FIGURE 14 which may be threaded through openings in the outer housing 131 and connected to energize the magnetic bearing coils from a current transformer that may be included in the low temperature space occupied by the motor. It is preferred that the bearing coils 133 be connected in parallel circuit relationship to a source of direct current energizing signals through a suitable control rheostat. In this manner, it will be assured that all of the magnetic bearing coils 133 will be energized equally so as to produce equal value magnetic pressure bearing forces acting against the superconductive surfaces 130 on rotor member 132.

In order to support the rotor member 132 in the longitudinal direction within the housing 13, a magnetic thrust bearing coil 135 is provided at each of the ends of the housing 131. Each of the thrust bearing coils 135 comprises a plurality of turns of thin superconductive wire formed in a circular loop with the turns of the coil being insulated from each other and from the outer housing 131. In order to reduce the current requirements of the bearing structure of the rotor, a superconductive bearing plate 136 is seated over the thrust bearing coils 135. The bearing plates 136 may then be used to capture flux developed by the thrust bearing coils 135 in the manner described earlier to produce a magnetic flux that acts against the superconductive surface 130 on the rotor 132 to support the rotor member in the longitudinal direction.

The rotor 132 comprises an integrally formed and cylindrically shaped core member which has openings 138 therein that are in the form of small circular passageways extending parallel to a shaft portion 139 that protrudes through an opening 141 in the outer housing 131. The core member 132 serves to cradle a rotor winding 142 and for this purpose includes a centrally disposed core portion 143. The rotor winding 142 preferably comprises a large number of turns of thin superconductive wire wound around the core portion 143 to form a closed current conducting loop. For this purpose, the core portion 143 may include grooved portion 144, best seen in FIGURE 15 of the drawings which defines a saddle for the windings of the coil 142, and serves to hold the rotor winding firmly in place. To further insure that the turns of rotor winding 142 will be properly secured on the core portion 143 cover plates 145 may be provided and secured by any means such as welding, screws and the like to the core member 132. In order to energize the rotor windings 142 a pair of leads 146 are provided which are led out to a pair of slip rings 147 and 148, respectively, and are coaxially arranged around the axis of the rotor member 137 on the end thereof opposite the shaft 139. The slip rings 148 are adapted to mate with corresponding brushes formed on a longitudinal movable contact member 149. The slip ring on the contact member 149 are connected out through conductors 151 to a source of energizing potential. The movable contact member 149 itself, however, is supported on housing member 131 by a series of biasing springs 152 which serve to bias the brushes on the movable contact member 149 out of engagement with the slip rings 147, 148 on the rotor member 132. In order to close the movable contact member 149 on the slip rings 147 and 148, an annularly shaped superconductive bearing surface 153 is provided together with a magnetic thrust coil 154 seated in the end of outer housing 131. The thrust coil 154 may be formed of a small number of turns of thin superconductive wires which encircle the axial opening in housing 131 that accommodates the lead wires 151. Upon energizing the thrust coil assembly 154, the magnetic pressure built up between the coil and the superconductive plate 153 will move contact member 149 against biasing springs 152 thereby allowing the brushes formed on its face to contact the slip rings 147 and 148. In this manner energizing current is supplied to the rotor winding 142 on the rotatable core member 137.

After rotor 132 is brought up to speed by energizing the rotor winding 142 in the above described manner, it may be desirable to capture or freeze in the flux producing current in the superconducting turns of the rotor winding 142 thereby allowing the source of energizing current to be disconnected. For this purpose, a superconductive gate element 156 is connected across the ends of the turns of the rotor winding 142, and when rendered superconductive serves to short circuit the turns. Surrounding the superconductive gate element 156 is a superconductive field winding 157 which is fabricated from a superconducting material having a higher critical magnetic field strength than the material out of which the gate element 156 is formed. The field winding 157 has a conductive lead brought out to a slip ring 158 adjacent slip rings 147 and 148 in order that it too may be selectively energized through one of the lead-in conductors 151 simultaneously with the energization of the turns of rotor winding 142. By this arrangement, the field winding 157 will be energized simultaneously with the rotor winding 142 so that element 156 will be broken down and will no longer be superconducting. Hence, it will not short circuit the turns of winding 142. After reaching a desired speed where it is desired to freeze a particular circulating current in the turns of rotor winding 142, the field winding 157 may be de-energized allowing the gate element 156 to again become superconductive. Upon gate elements 156 becoming superconductive, it freezes in or captures the circulating current flowing in the field winding 142 so that a standing flux pattern is created. Thereafter, the longitudinally slidable contact member 149 may be released so that it is pushed back out of contact with the slip rings 147, 148 and 158 by the action of the biasing springs 152.

In order to develop a rotating magnetic field that coacts with the magnetic field developed by the rotor field winding 142 a three phase stator field winding comprised by three pairs of windings 161 is provided. Each pair of the three phase stator field windings 161 may comprise two electrically interconnected coils formed from a plurality of turns of 5 mil diameter formex coated niobium wire such as shown in FIGURE 15 of the drawings. The coils 161 are secured on suitable mounting blocks within the housing 131, and held there by means of a potting compound (not shown) that coacts with dovetailing in the housing 131 (not shown). The schematic circuit wiring diagram of the three phase stator field winding 161 is shown in FIGURE 16 of the drawings. From an examination of FIGURE 16, it can be appreciated that one pair of phase windings will be formed by the windings 161a and 161c connected to the input terminal 162. A second pair of phase windings is formed by the windings 161d and 161e which are connected to the input terminals 163, and the third pair of phase windings is formed by the windings 161f and 161b connected to the input terminal 164. Each of the input terminals 162, 163 and 164 are excited from a separate phase of a three phase alternating current signal source in a manner such that the current through the respective coils of each phase reaches a peak approximately 120° ahead or behind the current peak in the next adjacent set of phase windings. In this manner, a rotating magnetic field flux will be produced about the rotor member 143 which will coact with the magnetic flux produced by supplying a direct current through the rotor field winding 142 to cause the rotor to rotate. By varying the frequency of this three phase energizing signal, the rotor 143 can be made to synchronously follow the rotating magnetic field until it is brought up to a desired speed. If it is desired, a motor control circuit such as the one shown in FIGURE 9 of the drawings may be used to facilitate this operation by coordinating the speed of the rotor 137 with the frequency of the signals supplied to the three phase winding 161.

An alternative construction for the rotor field winding 142 shown in FIGURES 13 and 15 of the drawings, is illustrated in FIGURES 17 and 18. In the rotor construction shown in FIGURES 17 and 18, it is anticipated that the member there illustrated would be substituted for the rotor core member 143, and rotor field winding 142 shown in perspective in FIGURE 15. In the rotor construction of FIGURES 17 and 18, a generally cylindrical hollow rotor member 165 is provided which is fabricated from a super-conducting material such as niobium. The cylinder 165 is divided into three interior chamber portions by a pair of inner dividing walls 166 and 167 which are likewise formed of superconducting material. These dividing walls 166 and 167 apportion off the generally cylindrical body 165 into two segments indicated at 168 that correspond to the circular rotor field winding 142 of the rotor construction shown in FIGURES 13–16. In order to trap a flux in the two segments 168, a heating wire 169 is provided across one face of the cylindrical rotor member 165 which will render the portion of the member 165 in its immediate vicinity nonsuperconducting upon being heated so that magnetic flux lines may enter the space between the two dividing walls 166 and 167 thereby threading around the circular segment portions 168. Thereafter, if the current through the heating wire is terminated the plate or face of the superconductive member 165 will again become superconducting, and capture the flux threading therethrough. The flux to be frozen around the portions 168 of the rotor construction shown in FIGURES 17 and 18 may be supplied to the rotor member 165 initially by applying a D.C. current to the three phase field winding of the motor. Upon the face of the superconductive body 165 which contains heating wires 169 again becoming superconductive, the magnetic flux threading the two segments 168 will be trapped or frozen in due to the circulating currents captured in the closed path formed by the two inner wall portions 166 and 167 and their corresponding outer circular perimeter portions 168. The flux thus captured may then coact with a rotating magnetic field supplied by three phase stator field winding 161 to provide a synchronous motor action in the manner described previously.

The schematic layout of a new and improved step motor construction in accordance with the principles of the present invention is shown in FIGURE 19 of the drawings. It is anticipated in FIGURE 19 that the working part of the motor therein disclosed would be included in a suitable housing similar to the previous motor constructions described without requiring further description. Accordingly, it is deemed sufficient to disclose the FIGURE 19 motor construction in schematic form only. In the step motor shown in FIGURE 19, a rotor 171 is provided which has a number of sawtooth-shaped serrations 172 formed about its periphery. The rotor 171 may comprise a solid piece of superconducting material, or it may be fabricated from a material such as iron; however, it is essential that the surface containing the sawtooth-shaped serrations 172 be superconducting. The rotor 171 may be supported for rotation about the axis 173 by any suitable bearing construction such as conventional journal or ball bearings. The rotor 171 is adapted to be rotated step by step in a counterclockwise direction by a drive coil 174 positioned immediately adjacent the serrated periphery. The drive coil 174 is made from a small number of turns of super-conducting wire, for example, 50 turns of 10 mil diameter Formex coated niobium wire wound about a suitable magnetic core member. Drive coil 174 is capable of producing a strong magnetic field that acts against superconductive sawtooth wave serrated edge of the rotor 171. As indicated by the dotted line vector arrow, the main force of this magnetic field acts on a lever arm pivoted about the axis of rotation 173 of rotor 171 so that it causes the rotor to be rotated counterclockwise. In order that a stepped portion of the circumference of the rotor 171 will be in the position indicated by the solid lines relative to the drive coil 174, a position coil 175 is provided which likewise comprise a small number of turns of perhaps 5 mil diameter Formex coated niobium wire wound around a non-magnetic core member. The positioning coil 175 is preferably connected through a control rheostat 176 to a source of direct current energizing potential 177. The position coil 175 accordingly will produce constant magnetic flux which will act against the steep leading edge portion 178 of the sawtooth serrations on the circumference of rotor 171 to cause the rotor to be stopped or located in the position shown by the solid lines. After application of a drive signal pulse to the drive coil 174, the magnetic pressure developed by drive coil 174 will act against a superconductive surface of sawtooth-shaped serrated edge of rotor 171 to cause the rotor to be rotated to the position indicated by the dotted line in FIGURE 19. Thereafter, the constant flux produced by the position coil 175 will cause the rotor to be rotated further until it comes in position shown by the solid lines where the flux of the position coil 175 acting against the steep leading edge portion 178 of the tooth exactly balances the force of the flux acting against the gradually inclined surface of the serration of the rotor 171.

As the rotor 171 is brought into position by the position coil 175, a sawtooth-shaped serration 172 will be brought into position immediately under a pickup coil 179. The pickup coil 179 may be fabricated from a large number of turns of 5 mil diameter formex coated niobium wire, and has its field winding connected as one arm of a bridge circuit 180 that is excited from a constant current alternating current signal generator 181. As a sawtooth-shaped serration 172 comes immediately under the pickup coil 179, it will cause the flux threading the field winding thereof to be changed thereby changing the self inductance of the pickup coil to an imbalance in the bridge circuit 181. This produces an output trigger signal pulse which is connected through an alternating current amplifier 182 to a detector 183. The detector 183 may be of the threshold or bias type which is capable of detecting signals having a given amplitude but does not pass signals of less amplitude. Accordingly, the threshold detector 183 will produce a pulsed output signal which may be supplied to a driver amplifier 185, that is connected to the field windings of the driver coil 174. By this construction, rotation of the step motor one step will produce a signal pulse to move the rotor 171 another step. If it is desired to interrupt operation of the circuit at any particular setting of the rotor 171, an on-off switch 186 may be opened to the driver coil 174. If desired, the on-off switch 186 may be included at some other point in the circuit. The operation of the circuits is thought to be apparent from the above description so it will not be again repeated. It should be noted however that the construction does take advantage of the unique properties of superconductive materials in its operation.

From the foregoing description it can be appreciated that many combinations and variations of motor construction are possible in the light of the present invention. It is therefore to be understood that the changes being made in any of the particular embodiments of the invention described herein are within the full and intended scope of the invention as defined by the appended claims.

What I claim as new and desire to secure by Letters Patent of the United States is:

1. In a superconductive electro-mechanical device, a housing, a rotor member within the housing mounted for rotation about a given axis, magnetic means supported by the housing for stably suspending the rotor without physical contact with the housing, and field windings supported by the housing to confront portions of the rotor; said field windings, magnetic means, and portions of the rotor and housing in the vicinity thereof being of superconductive material, said rotor portions in the vicinity of said field windings being formed to provide surface areas of increased magnetic pressure, and means for lowering the temperature of said members prior to energization to bring said superconductive materials to a superconductive state.

2. In a superconductive device including a housing and a rotor member magnetically suspended for rotation within the housing, a magnetic winding supported by the housing and energizable to produce an alternating current magnetic field about the rotor; portions of the housing, rotor, and winding members in the vicinity of the magnetic suspension and magnetic windings being of superconductive material, means for lowering the temperature of said members to render them superconductive, and said rotor being formed to possess portions symmetrically disposed thereabout providing areas of increased magnetic pressure in the presence of a magnetic field between said rotor and windings.

3. In a superconductive magnetic motor, a housing, a rotor member within the housing mounted for rotation about a given axis, energizable means for producing a magnetic field operating against portions of the rotor to propel the rotor in synchronism therewith, said portions of the rotor in the vicinity of the magnetic field being fabricated of superconductive materials, and means surrounding said housing for lowering the temperature of said portions prior to energization to bring said superconductive materials to a superconductive condition.

4. In a superconductive device, a housing, a rotor member within the housing supported for rotation therein about a given axis, electrical windings, supported by the housing to confront portions of the rotor; said confronting rotor portions being formed of superconductive materials preventing the penetration of magnetic fields therein and serving to confine a magnetic field in the area therebetween, and said rotor portions being formed to provide areas of varying magnetic force directed away from said axis.

5. In a substantially lossless electromotive device comprised of a stator housing and rotor fabricated at least in part of superconductive materials capable of stable and dependable operation at extremely low temperatures in the order of absolute Kelvin; including superconductive magnetic bearing means carried by the housing for supporting the rotor completely out of mechanical contact with the housing and a stator winding supported by the housing in a position to confront superconductive portions of the rotor to cause the rotor to rotate.

6. In a substantially lossless electromotive device comprised of a stator housing and rotor fabricated at least in part of superconducting materials capable of stable and dependable operation at extremely low temperatures in the order of absolute Kelvin the provision of superconductive magnetic bearing means carried by the housing for supporting the rotor completely out of mechanical contact with the stator, and superconductive stator windings supported by the housing and confronting superconducting portions of the outer surface of the rotor, said rotor outer surface portions being formed to provide areas of variable magnetic pressure between it and the stator windings.

7. In the device of claim 6, said rotor being formed with an outstanding brim portion projecting toward the stator windings with the surface areas of this brim portion being configured so that the normal to such surface areas does not pass through the central axis of the rotor.

8. In the device of claim 6, said rotor being provided with a generally polygon shaped band of superconductive material supported about its outer periphery in confronting relation to the stator windings.

9. In the device of claim 6, said rotor being provided with a series of openings about its outer periphery in positions to confront the stator windings.

10. In the device of claim 6, said rotor being provided with a plurality of permanent electromagnets about its periphery in confronting relation to said stator windings.

11. In a substantially lossless superconductive motor comprised of a stator housing and rotor fabricated at least in part of superconducting materials capable of stable and dependable operation at extremely low temperatures in the order of absolute Kelvin, including superconductive magnetic bearing means carried by the housing for supporting the rotor completely out of mechanical contact with the stator, and superconductive stator windings supported by the housing and confronting superconducting portions of the rotor surface, the spacing between the confronting portions of the stator windings and rotor being variable to provide areas of increased and decreased magnetic pressure upon the generation of a magnetic field therebetween, an alternating current pickoff device for generating electrical signals having a frequency proportional to the rotative speed of the rotor, and means connecting said pickoff device to energize said stator winding.

12. In a substantially lossless electromotive device comprised of a stator housing and rotor fabricated at least in part of superconducting material capable of stable and dependable operation at extremely low temperatures in the order of absolute Kelvin, including superconductive magnetic bearing means carried by the housing for supporting the rotor completely out of mechanical contact with the stator, superconductive stator windings supported by the housing in confronting relation to superconducting portions of the rotor surface, the spacing between the superconducting portions of the rotor confronting the stator windings being variable to provide areas of increased and decreased magnetic pressure upon the generation of a magnetic field therebetween, cooling means for lowering the temperature of said electromotive device to bring the superconductive portions of the rotor, said superconductive bearings and said superconductive stator windings to a superconductive condition, and means for substantially evacuating the air within said housing.

13. In a substantially lossless electromotive device comprised of a superconductive stator housing and a superconductive rotor and capable of stable and dependable operation at extremely low temperatures in the order of absolute Kelvin, including superconductive magnetic bearing means carried by the housing for supporting the rotor completely out of mechanical contact with the stator, superconductive stator windings supported by the housing in confronting relation to the rotor surface, the spacing between the confronting portions of the stator windings and rotor being variable to provide areas of increased and decreased magnetic pressure upon the generation of a magnetic field therebetween.

14. A new and improved electric motor comprising a housing, a rotor including a superconducting current carrying portion for developing a magnetic flux rotatably supported within said housing, and a stator field winding secured within said housing and confronting said superconducting current carrying portions of said rotor for developing a driving magnetic field that reacts with the magnetic flux developed by said current carrying portion to cause said rotor to rotate.

15. A new and improved electric motor comprising a housing, magnetic bearing coils fabricated from superconducting material secured within said housing, a rotor having superconductive surfaces confronting said bearing coils for floatingly supporting said rotor completely out of mechanical contact with said housing, said rotor including a superconducting current carrying portion for developing a magnetic flux, and a superconductive stator field winding secured within said housing and confronting said superconducting current carrying portions of said rotor for developing a driving magnetic field that reacts with the magnetic flux developed by said current carrying portions to cause said rotor to rotate.

16. The combination set forth in claim 15 wherein said superconducting current carrying portion of said rotor comprises a generally cylindrical superconductive member shaped to provide flux concentration at diametrically opposed points.

17. A new and improved electric motor comprising a housing, magnetic bearing coils fabricated from superconducting material secured within said housing, a rotor having superconductive surfaces confronting said bearing coils for floatingly supporting said rotor completely out of contact with said housing, said rotor including a superconducting current carrying portion for developing a magnetic flux, a superconductive stator field winding secured within said housing and confronting said superconducting current carrying portions of said rotor for developing a driving magnetic field that reacts with the magnetic flux developed by said current carrying portions to cause said rotor member to rotate, a brush arranged on said rotor and a slip ring arranged on a selectively operable slide member supported on said housing for selectively exciting the superconductive current carrying portion of said rotor, and a superconductive gate element connected across said current carrying superconductive portions of said rotor for selectively short circuiting the same to capture a flux producing circulating current in said portion.

18. The combination set forth in claim 17 wherein said superconductive current carrying portion comprises a large number of turns of fine superconducting wire and said superconductive gate element is connected across the ends of the wire.

19. An electromotive device comprising a housing, a rotor fabricated at least in part of superconductive materials supported for rotation within said housing, and a stator field winding supported by said housing in confronting relation to the superconductive portions of said rotor for producing a magnetic field to cause said rotor to rotate, all of said superconductive parts being at superconducting temperatures while said motor is operating.

20. A new and improved electric step motor comprising a rotor member having a peripheral surface fabricated from superconducting material, and step by step selectively operable magnetic field producing means for producing a drive magnetic field that acts against the peripheral surface of said rotor member in a direction that is displaced from the axis of rotation of said rotor member to cause the same to rotate in a step by step fashion, said superconductive peripheral surface being at superconducting temperature during operation of said step motor.

21. A new and improved electric step motor comprising a rotor having a serrated peripheral surface fabricated from superconducting material, first step by step selectively operable magnetic field producing means for producing a drive magnetic field that acts against the serrated peripheral surface of said rotor member in a direction that is displaced from the axis of rotation of said rotor member to cause the same to rotate in a step by step fashion, second magnetic field producing means for producing a constant magnetic field that acts against the superconductive peripheral surface of said rotor at the end of each stepping movement to cause the same to be accurately positioned for the next succeeding step, pickup means for deriving an output electric signal indicative of a step movement of the rotor, and circuit means operatively coupled to said pickup means and to said first magnetic field producing means for actuating the same with the signal developed by said pickup means.

References Cited in the file of this patent

Standard Handbook for Electrical Engineers, McGraw-Hill, New York, 1933, 6th ed., p. 218, Fig. 109.